(12) United States Patent
Anderson

(10) Patent No.: US 6,595,219 B2
(45) Date of Patent: Jul. 22, 2003

(54) HAIRBRUSH WITH RETRACTABLE BRISTLES

(76) Inventor: Mitchell E. Anderson, 10382 Dunham Rd., Hartland, MI (US) 48353

( * ) Notice: Subject to any disclaimer, the term of this patent is extended or adjusted under 35 U.S.C. 154(b) by 0 days.

(21) Appl. No.: 09/968,698

(22) Filed: Oct. 1, 2001

(65) Prior Publication Data

US 2002/0078971 A1 Jun. 27, 2002

Related U.S. Application Data

(60) Provisional application No. 60/297,674, filed on Jun. 12, 2001, and provisional application No. 60/237,071, filed on Sep. 30, 2000.

(51) Int. Cl.[7] .................. A45D 24/10; A45D 24/06; A45D 24/00
(52) U.S. Cl. .................. 132/123; 132/219; 132/131
(58) Field of Search .................. 132/123, 219, 132/120, 131, 136, 129, 116, 122, 126, 144, 148, 150; 15/184, 185, 164, 169; D4/136, 121, 130, 132–138

(56) References Cited

U.S. PATENT DOCUMENTS

| | | | |
|---|---|---|---|
| 1,189,698 A | 7/1916 | Keating | |
| 1,280,180 A | * 10/1918 | Deason | 132/123 |
| 2,244,068 A | * 6/1941 | Kay | 132/123 |
| 4,023,230 A | 5/1977 | Friedman et al. | 15/185 |
| 4,137,596 A | * 2/1979 | Carlson et al. | 15/203 |
| 4,191,200 A | * 3/1980 | Renda | 132/123 |
| 4,225,997 A | 10/1980 | Thomas et al. | 15/184 |
| 4,412,365 A | 11/1983 | Schmitt | 15/184 |
| 4,574,416 A | 3/1986 | Stewart et al. | 15/169 |
| 4,977,909 A | 12/1990 | Chou | 132/123 |
| D319,923 S | 9/1991 | Chou | D4/136 |
| 5,519,912 A | 5/1996 | Kawamura | 15/160 |
| 5,862,563 A | 1/1999 | Hartmann | 15/169 |

* cited by examiner

Primary Examiner—John J. Wilson
Assistant Examiner—Robyn Kieu Doan
(74) Attorney, Agent, or Firm—James M. Deimen

(57) ABSTRACT

A hairbrush comprising retractable bristles to ease removal of hair from the brush comprises an internal wedge and wheel mechanism actuated by a sliding button and link to the wheel. Alignment channels assure movement of the bristles through the perforated panel without binding. In alternative embodiments, a full expandable linkage or a half expandable linkage extend and retract the bristles through the perforated panel of the hairbrush.

5 Claims, 3 Drawing Sheets

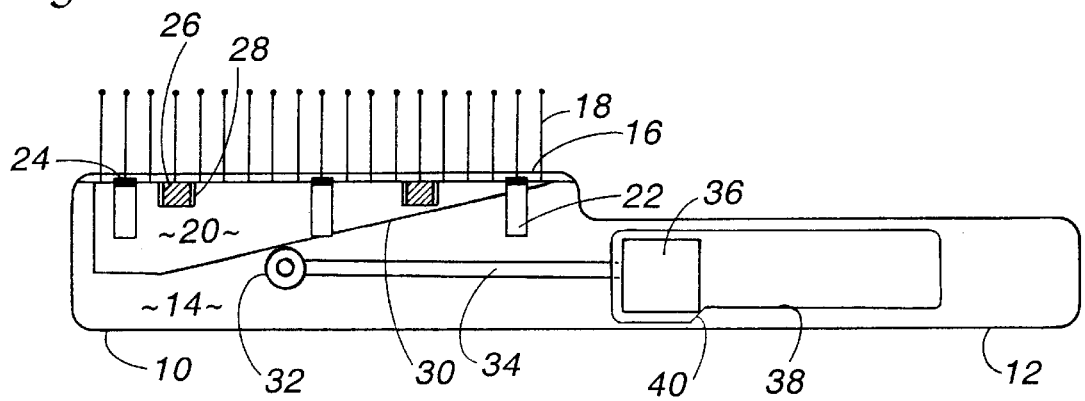
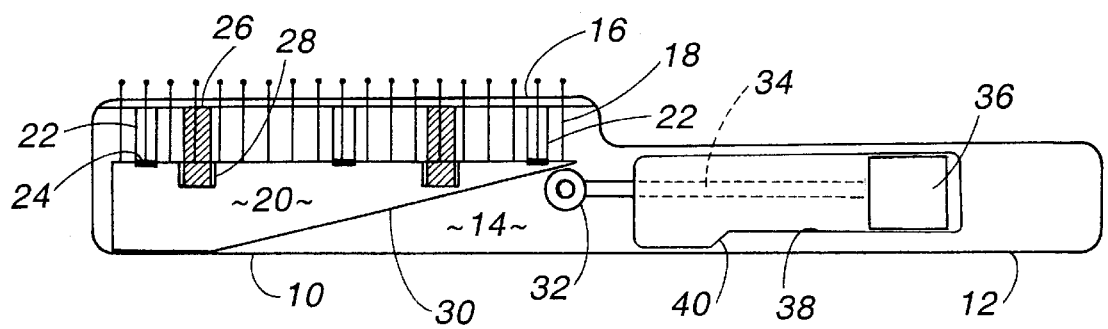
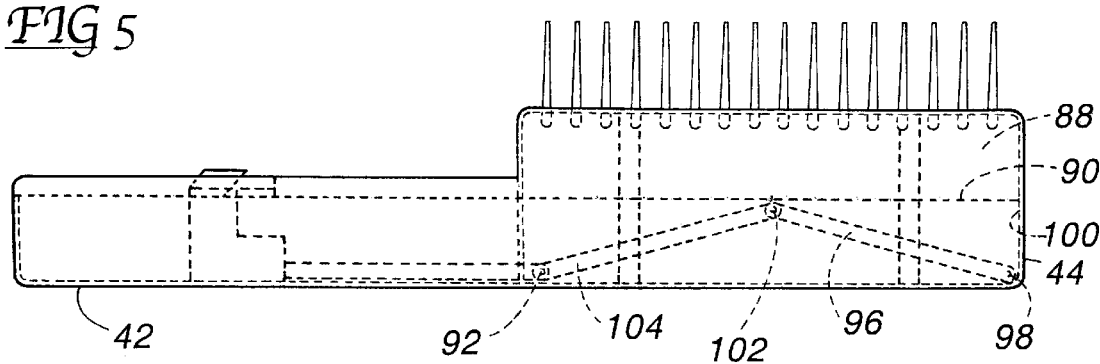

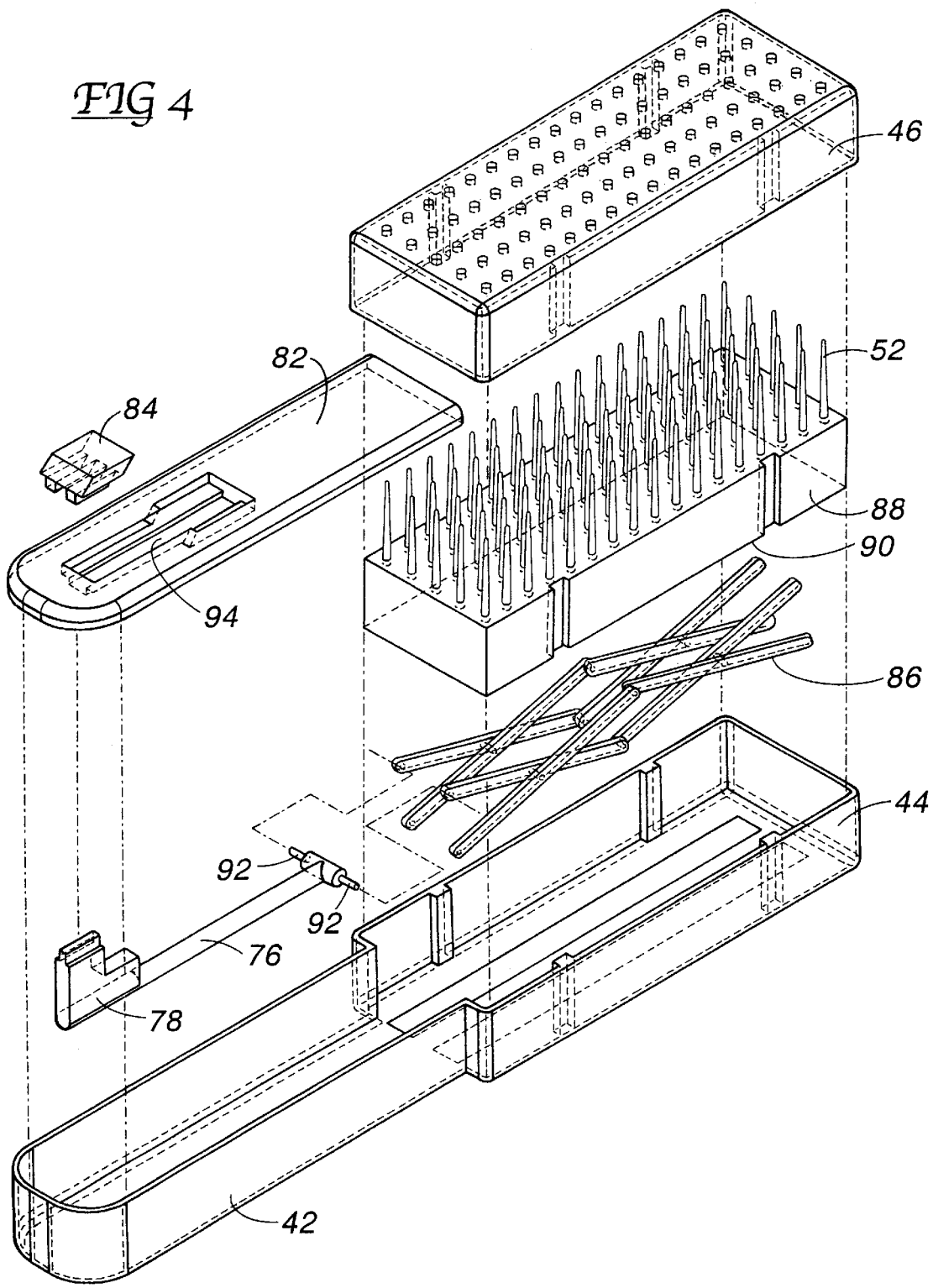

HAIRBRUSH WITH RETRACTABLE BRISTLES

BACKGROUND OF THE INVENTION

This application claims the benefit of provisional application No. 60/237,071, filed Sep. 30, 2000, and provisional application No. 60/297,674, filed Jun. 12, 2001.

The field of the invention pertains to hairbrushes for use on human hair or other animal hair and, in particular, to hairbrushes used to groom long hair.

A constant problem with long hair is the entanglement of hair in the hairbrush bristles with repeated brushing. Eventually, the entangled hair must be removed from the bristles, which can be a tedious and frustrating effort. The difficulty can be compounded if the person using the hairbrush has limited capability with his or her fingers.

With this problem in view, a variety of hairbrushes have been developed with devices to quickly and easily remove the hair from the bristles. U.S. Pat. No. 4,225,997 discloses a bristle supporting member that is retractable and extendable within an enclosed chamber of the brush. The bristles extend through a perforated plate. A laterally extending pin is positionable in a plurality of discrete holes to provide multiple discrete bristle lengths in addition to cleaning of the bristles at the maximum retraction position.

In U.S. Pat. No. 4,977,909, the retractable bristles are actuated by a push button acting upon a flexible resilient member inside the hollow brush. Pushing on the button extends the bristles and latches the button. Sliding back the button slightly allows the button to unlatch and release the bristles to retract into the brush thereby cleaning the bristles.

As distinguished from the above patents, U.S. Pat. No. 5,519,912 discloses a perforated plate movable on the bristles to clean the bristles. The bristles have enlarged tips to prevent the perforated plate from being removed from the bristles.

U.S. Design Pat. No. Des. 319,923 discloses a brush with retractable bristles that somewhat resembles U.S. Pat. No. 4,977,909 above but does not reveal the internal retraction mechanism. Rather, the resemblance arises from the push button operation.

U.S. Pat. No. 4,023,230 and U.S. Pat. No. 1,189,698 each disclose bristles that extend and retract through curved guides. The former also discloses a wedge assembly to extend and retract the bristles by the extension and retraction of the entire brush handle.

U.S. Pat. No. 4,412,365 discloses a plurality of diagonal cam tracks that engage a plurality of pins extending from the bristle retainer. Extension and retraction of the entire handle moves the cam tracks in a direction substantially perpendicular to the bristles causing the bristles to extend and retract.

In U.S. Pat. No. 4,574,416, a pivotable handle portion actuateable by the user causes the bristle retainer to extend the bristles when the handle is squeezed. A spring urges the bristles into the retracted position upon release of the handle; however, in U.S. Pat. No. 5,862,562 springs, in opposition to a handle push button, urge the bristles into extended position.

With a view toward providing a simpler more effective retractable bristle hairbrush, the following hairbrush has been developed.

SUMMARY OF THE INVENTION

The invention comprises an internal plate within the brush body to which bristles, plastic, natural or metal, are attached. The bristles extend through holes in the brush body with each hole dedicated to each individual bristle. The internal plate is attached to a wedge mechanism actuated by a link arm and wheel inside the brush body. The link arm is actuated by a sliding button in the side of the brush body. Manual actuation of the button causes the linkage to extend and retract the bristles. With full extension of the bristles, a detent latch in the brush body locks the linkage.

Modified linkages also may be used to extend and retract the bristles. In particular, an expandable linkage in either full form or half form beneath the bristles may be substituted for the wheel and wedge mechanism.

These brush designs can be used for either human or animal type hair brushes. With the bristles retracted, the hair caught in the bristles is separated from the bristles and can be easily discarded without damage to the bristles. The result is a quicker, easier, safer and more sanitary way of cleaning the brush.

Disclosed below are three versions of the new hairbrush.

BRIEF DESCRIPTION OF THE DRAWINGS

FIG. 1 is a side view schematic of the hairbrush with the bristles extended;

FIG. 2 is a side view schematic of the hairbrush with the bristles retracted;

FIG. 4 is an exploded perspective view of a second alternative form of the hairbrush; and FIG. 5 is a side elevation of a simplified version of the hairbrush shown in FIG. 4.

DESCRIPTION OF THE PREFERRED EMBODIMENTS

Figure 3:
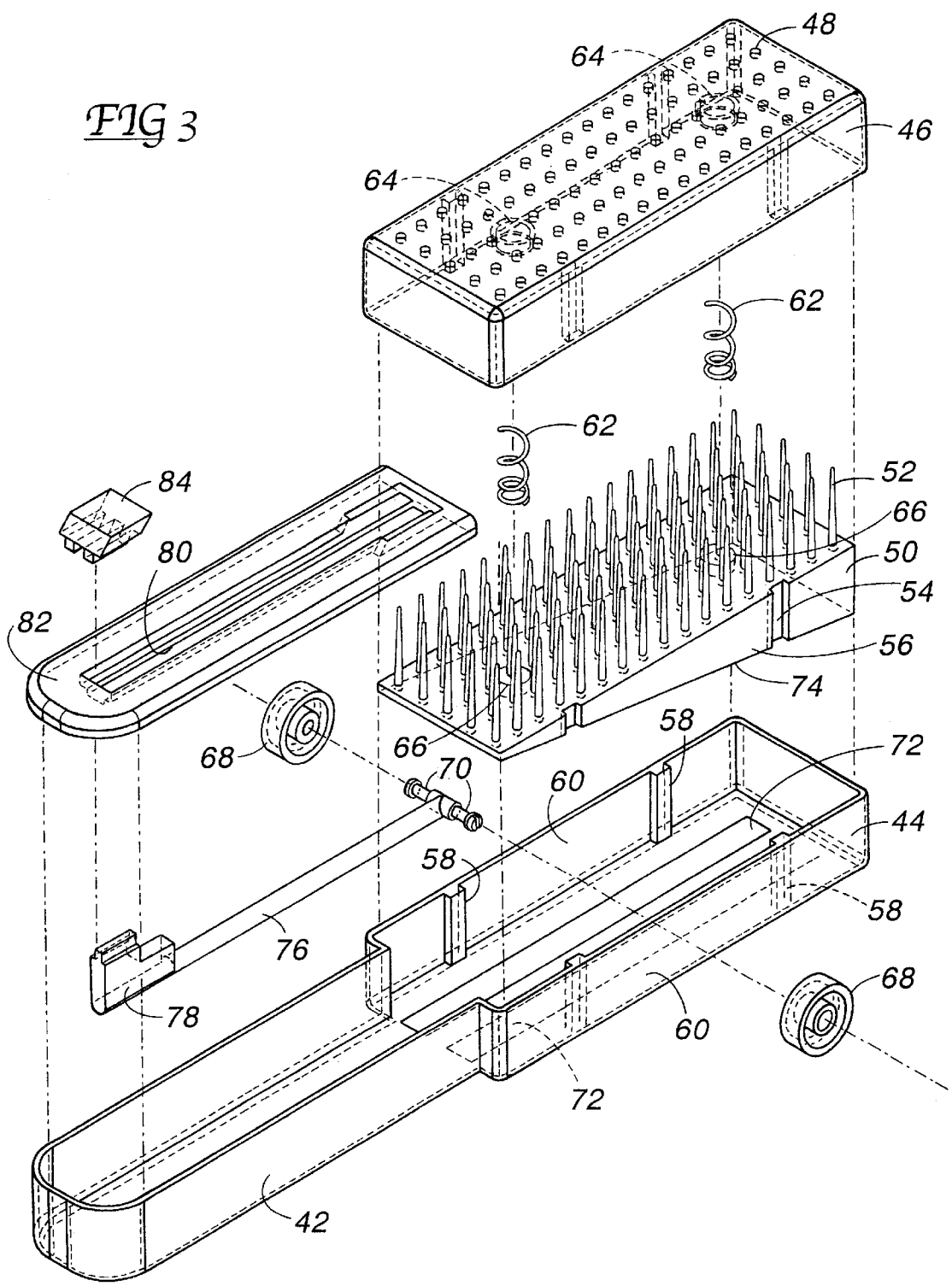
FIG. 3 is an exploded perspective view of an alternative form of the hairbrush.

Illustrated in FIGS. 1 and 2 is a brush body 10 with an integral handle 12. The brush body 10 is formed with a hollow chamber 14 therein and a perforated panel 16 through which a plurality of bristles 18 extend. Within the chamber 14 is a generally wedge shaped member 20 to which the bristles 18 are attached.

A plurality of guide channels 22 are formed in the wall of the brush body 10 within the chamber 14. Studs 24 engage the channels 22 to guide movement of the wedge shaped member 20 and bristles 18. A plurality of springs 26 are positioned in recesses 28 in the wedge shaped member 20. The springs 26 engage the panel 16 and are in compression to thereby urge the wedge shaped member 20 and bristles 18 toward the retracted position.

Engaging the wedge shaped member 20 on the cam surface 30 is a wheel or roller 32 in turn rotatably attached to a link arm 34. The link arm 34 is attached to a sliding button 36 extending into a recess 38 in the handle 12. Thus, manual movement of the sliding button 36 causes the bristles 18 to retract and extend. The recess 38 is shaped at 40 to provide a detent for the sliding button 36. As shown, the sliding button 36 is shaped to engage the detent 40 when the bristles 18 are extended thereby locking the bristles in the extended position.

In FIG. 3, the hairbrush comprises a handle 42 and box 44 portion and a box cover portion 46 with a plurality of bristle apertures 48. Within the box 44 and cover 46 is a wedge shaped bristle retainer 50 having a plurality of bristles 52 extending therefrom. A pair of guides 54 are formed in each sidewall 56 of the bristle retainer 50. The guides 54 engage complementary guides 58 formed in the sidewalls 60 of the box 44 and box cover 46. A pair of springs 62 engage sockets 64 in the underside of the box cover 46 and sockets 66 in the top of the bristle retainer 50 to urge the bristle retainer into the retracted position.

To extend and retract the bristles 52, a pair of small wheels 68 rotatably mounted on a transverse shaft 70 engage a pair of tracks 72 formed in the inner bottom of the box 44. The wheels 68 also engage the smooth flat oblique underside 74 of the bristle retainer 50. To move the wheels 68 and thereby extend and retract the bristles 52, the transverse shaft 70 is attached to a longitudinal shaft 76 which extends inside the handle 42 to an L-shaped member 78. The handle 42 has a slotted 80 cover 82. The L-shaped member 78 extends through the slot 80 and is fastened to a button 84 slideable along the slot 80. Thus, movement of the button 84 along the slot 80 extends and retracts the bristles 52. To complete the assembly once the various parts are assembled within the handle 42 and box 44, the covers 46 and 82 are adhesively fastened or laser welded to the box 44 and handle 42.

Referring to FIG. 4, the hairbrush of FIG. 3 is modified internally by the use of an expandable linkage 86 that fits beneath a modified bristle retainer 88. The bottom 90 of the modified bristle retainer 88 engages the linkage 86 and a modified transverse shaft 92 engages the linkage 86 at the handle 42 end of the linkage. In this embodiment, the button slot 94 is shorter than the slot 80 in FIG. 3.

In FIG. 5, the hairbrush is further modified by simplifying the linkage 86 of FIG. 4 to the "half linkage" 96 wherein the box 44 end 98 of the linkage abuts the inside end wall 100 and the center 102 of the linkage engages the bottom 90 of the bristle retainer 88. The handle 42 end 104 of the linkage is connected to the transverse shaft 92.

What is claimed is:

1. A retractable bristle hairbrush comprising a hollow body having an integral handle, a perforated panel forming a portion of the body, a bristle retainer movable within the body and a plurality of bristles attached to the bristle retainer, the bristles being aligned to pass through perforations in the perforated panel, the improvement comprising an expandable linkage trapped between the bristle retainer bottom and the inner bottom of the hollow body, a longitudinal shaft having one end in engagement with the expandable linkage and the other end fitted with means to engage a button slideable on the handle.

2. The retractable bristle hairbrush of claim 1 wherein said expandable linkage comprises at least one set of four bars linked pivotally to expand transversely when squeezed longitudinally by the longitudinal shaft upon actuation of the button.

3. The retractable bristle hairbrush of claim 2 including a detent for engagement with the button, the detent when engaged by the button thereby retaining the bristles in extended position.

4. The retractable bristle hairbrush of claim 1 wherein said expandable linkage comprises at least one set of two bars linked pivotally to expand transversely when squeezed longitudinally by the longitudinal shaft upon actuation of the button.

5. The retractable bristle hairbrush of claim 4 including a detent for engagement with the button, the detent when engaged by the button thereby retaining the bristles in extended position.

* * * * *